United States Patent Office 3,574,742
Patented Apr. 13, 1971

3,574,742
AMINOALICYCLIC CARBOXHYDRAZIDES
Milton Lapidus, Rosemont, Norman H. Grant, Wynnewood, and Harvey E. Alburn, West Chester, Pa., assignors to American Home Products Corporation, New York, N.Y.
No Drawing. Filed June 25, 1968, Ser. No. 739,624
Int. Cl. C07c *103/86*
U.S. Cl. 260—557        2 Claims

ABSTRACT OF THE DISCLOSURE

Aminoalicyclic carboxhydrazides are prepared by the reaction of an aminoalicyclic carboxylic acid anhydride with a hydrazine. The compounds have biochemical activity and are useful as immuno-suppressive agents.

---

This invention relates to aminoalicyclic compounds and more particularly to hydrazides of aminoalicyclic carboxylic acids having biochemical activity.

It is well recognized that there are natural defenses in warm-blooded animals against foreign substances which may be inadvertently or deliberately introduced into the animal body. For example, there is a natural immunity in healthy animals against the presence of foreign proteins or antigens which manifests itself by a body defense resulting in the production of antibodies tending to protect the animal by either combining with the foreign substance to suppress its effect or by a reaction mechanism tending to reject the foreign substance.

However, in certain circumstances, there are recognized disadvantages to the defense mechanism of the animal body. The problem of natural body defenses must be met when foreign tissues or organ transplants are contemplated. It then becomes necessary to find some means for suppressing the autoimmune phenomena at least to a point where the foreign tissue can carry out its necessary function without rejection.

In testing certain compounds in the pharmacological area to determine the effectiveness of drugs capable of suppressing the autoimmune response, one of the many problems that arises is that the drug itself must be relatively nontoxic under the conditions of use. Another problem is that the drug must not be so drastic in its action as to weaken the living animal beyond repair. Thus, considerable experimentation and comparisons with substancess shown to be more or less effective are required, particularly since no one drug of choice has as yet proven completely effective or satisfactory.

Many compounds have been proposed as more or less capable of blocking the autoimmune process in animals, in general being of the class of corticosteroids, for example, cortisone, or antimetabolites such as the cytotoxic drugs, azathioprine, 6-mercaptopurine, amethopterin and the nitrogen mustards. These agents have been recognized previously as anti-inflammatory agents or suppressants of protein synthesis and many of them have been used as antineoplastic agents for their cytotoxic effects. While it has not been definitely established why these drugs also demonstrate antiautoimmune activity, the fact is that they do show reasonable effective action at least in experimental pharmacology.

It has been found that certain compounds, chemically unrelated to those mentioned hereinabove are active in suppressing the autoimmune reaction in warm-blooded animals and are therefore deemed useful as antiautoimmune agents in experimental and comparative pharmacology. The compounds may be described as a class of aminoalicyclic carboxhydrazides having the following structural formula:

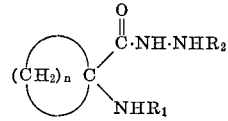

in which $n$ is an integer from 2 to 7, with $R_1$ and $R_2$ each representing hydrogen or lower alkyls of 1 to 4 carbon atoms, and considered together, may be similar or dissimilar. Preferred compounds are those where $n$ is 4 or 5, with $R_1$ and $R_2$ standing for hydrogen.

The compounds of the invention are prepared by reacting an N-carboxy-1-aminoalicyclic carboxylic acid anhydride, which could also be considered a 3,4-disubstituted or 4-substituted-2,5-oxazolidinedione with hydrazine or an alkyl substituted hydrazine. The reaction may be illustrated as follows:

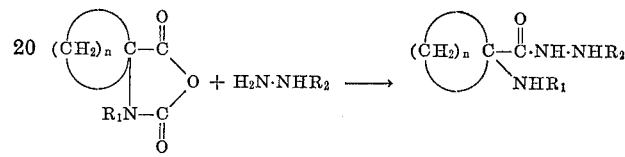

In the above reaction scheme, $n$, $R_1$ and $R_2$ have the meanings previously assigned. The reaction is carried out at ambient temperature using an inert solvent such as methanol. The reaction is generally completed within an hour. The starting materials are all known compounds or if not readily available may be prepared by known procedures well within the skill of the art. One method for preparing the oxazolidinediones is disclosed in U.S. Pat. No. 3,194,802, dated July 13, 1965.

In the pharmacological evaluation of the products prepared by the aforesaid reaction, they were submitted to a battery of tests including procedures capable of eliciting the suppressive effect of orally or parenterally administered test agents on the immune response by a test described by Nathan et al.: 107: 796, 1961, Proc. Soc. Exp. Biol. and Med. Another scientifically acceptable test for assessing the antiautoimmune activity of a compound is its ability to inhibit experimentally induced allergic encephalomyelitis (EAE) as indicated by hind limb paralysis, described by Brandriss: Science, 140: 186, 1963 and Levine et al.: Proc. Soc., 114: 220, 1963. The preferred procedure for carrying out the latter test is given as follows:

Male rats and guinea pigs are used. Animals are injected intradermally or into the hind paw with an emulsion containing guinea pig spinal cord, killed M. tuberculosis and Freund's adjuvant. The compound being tested is administered at the same time and then 3 to 5 times a week for the duration of the test. The animals are observed and weighed daily. Severe paralysis usually occurs at the 12th to 16th day. The degree of paralysis and possibly eventual death is scored according to a grading system. Control groups run at the same time usually show 60 to 70% paralysis with some mortality. An active compound will prevent paralysis and neural lesions with minimal toxicity. Known compounds showing activity in this test include cortisone, 6-mercaptopurine (Purinethol); azathioprine (Imuran) and amethopterin (Methotrexate). However, a number of these compounds are highly toxic and therefore must be used with caution. The compounds of the invention, on the other hand are not toxic at the effective dosage level. Thus, at a dosage range of 5 to 75 mg./kg. of body weight and preferably in the range of about 10 to 50 mg./kg. given orally in 6 doses within the above range three times a week for two weeks, the aminoalicyclic carboxylic acid compounds were found to be active as antiautoimmune agents without showing such toxicity as to preclude their use in experimental and comparative pharmacology.

The dosage as given above will vary according to the mode of administration with the higher dosage when given orally and the lower end of the range when administered parenterally, i.e., intraperitoneally, intradermally or subcutaneously. While the compound of the invention may be administered alone, it is usual to administer it in an inert carrier as a diluent or excipient, such carriers being well-known in the art, illustrated by such substances as lactose or talc when the medicament is intended for oral administration in the form of tablets or pellets, or in an aqueous or oleaginous medium when generally administered parenterally.

In order to provide a guideline for the preparation of compounds of the invention, the following procedure illustrates the details for preparing a typical compound, namely, 1-aminocyclopentane carboxylic acid, hydrazide.

EXAMPLE

To 500 ml. of methanol there was added 4.3 g. (0.085 mole) of hydrazine hydrate. This was followed by the addition of 13 g. (0.085 mole) of N-carboxyl-1-aminocyclopentanecarboxylic acid anhydride over a period of 30 minutes. After an additional 5 minutes of stirring, the system was evaporated to dryness under vacuum. The dry product, which was crystalline, was recrystallized from benzene, giving a yield of 8.04 g. M.P. 84–85° C.

Calc'd for $C_6H_{13}N_3O$ (percent); C, 50.32; H, 9.14; N, 29.34. Found (percent): C, 50.46; H, 8.95; N, 29.55.

In place of hydrazine, one may substitute methylhydrazine, ethylhydrazine, propylhydrazine, isopropylhydrazine, butylhydrazine, isobutylhydrazine, or tertbutylhydrazine. These, when reacted with the acid anhydride, will form the corresponding N-lower alkyl carboxylic acid hydrazines.

Additionally, in place of the acid anhydride used to illustrate the preparation of a compound of the invention, one may use, for example, N-carboxy-1-aminocyclohexylcarboxylic acid anhydride with hydrazine and thus produce the equally active 1-aminocyclohexylcarboxylic acid hydrazide. Further, the acid anhydride may be replaced with the N-carboxyanhydride of 1-aminocyclopropane carboxylic acid, 1-aminocyclobutane carboxylic acid, N-methyl-1-aminocyclopentane carboxylic acid, N-ethyl-1-aminocyclobutane carboxylic acid or 1-aminocyclooctane carboxylic acid.

While the active bases may be used for their pharmacological effects, acid-addition salts of the bases are also contemplated particularly when it is desired to solubilize the products of the invention. The acid-addition salts may be prepared in known manner using either mineral acids or the common organic acids generally available for the purpose. The acids are selected so that pharmaceutically acceptable salts are formed which would be nontoxic at the indicated dosage level.

While the above examples of reactants are given for illustrative purposes, the invention is to be considered as embodied within the scope of the appended claims.

The invention claimed is:
1. A compound having the formula

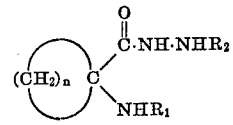

in which $n$ is an integer from 2 to 7, $R^1$ is selected from the group consisting of hydrogen and lower alkyl of 1 to 4 carbon atoms and $R^2$ is selected from the group consisting of methyl, ethyl, propyl, isopropyl, butyl, isobutyl, and tertbutyl.

2. A compound of claim 1, where $n$ is 4 or 5.

References Cited

Branquet et al., Bull. Soc. Chim. France, pp. 2942–43, 2951 (1965).

HENRY R. JILES, Primary Examiner

H. I. MOATZ, Assistant Examiner

U.S. Cl. X.R.

424—320; 260—307